(12) United States Patent
Ayres et al.

(10) Patent No.: US 10,336,159 B2
(45) Date of Patent: Jul. 2, 2019

(54) REFRIGERATION

(71) Applicant: DEARMAN ENGINE COMPANY LTD, Croydon (GB)

(72) Inventors: Michael Ayres, London (GB); Henry Clarke, London (GB); Michael Dearman, Bishops Stortford (GB)

(73) Assignee: DEARMAN ENGINE COMPANY LTD, Croydon (GB)

( * ) Notice: Subject to any disclaimer, the term of this patent is extended or adjusted under 35 U.S.C. 154(b) by 1043 days.

(21) Appl. No.: 14/443,760

(22) PCT Filed: Nov. 19, 2013

(86) PCT No.: PCT/GB2013/053056
§ 371 (c)(1),
(2) Date: May 19, 2015

(87) PCT Pub. No.: WO2014/076508
PCT Pub. Date: May 22, 2014

(65) Prior Publication Data
US 2015/0291007 A1 Oct. 15, 2015

(30) Foreign Application Priority Data
Nov. 19, 2012 (GB) .................................. 1220788.2

(51) Int. Cl.
*F25B 19/00* (2006.01)
*F25D 7/00* (2006.01)
(Continued)

(52) U.S. Cl.
CPC ........... *B60H 1/3202* (2013.01); *F01K 25/10* (2013.01); *F25B 9/004* (2013.01); *F25B 9/06* (2013.01);
(Continued)

(58) Field of Classification Search
CPC ........ F25B 19/00; F25B 19/005; F25B 9/004; F25D 7/00; F25D 3/10; F25D 3/102;
(Continued)

(56) References Cited

U.S. PATENT DOCUMENTS 3,451,342 A 6/1969 Schwartzman
3,699,694 A 10/1972 Hales et al.
(Continued)

FOREIGN PATENT DOCUMENTS

CN 101194132 A 6/2008
CN 101280977 A 10/2008
(Continued)

OTHER PUBLICATIONS

Great Britain Intellectual Property Office Search Report for Great Britain Patent Application No. GB1220788.2, dated May 24, 2013.
(Continued)

*Primary Examiner* — Frantz Jules
*Assistant Examiner* — Erik Mendoza-Wilkenfel
(74) *Attorney, Agent, or Firm* — Meunier Carlin & Curfman LLC

(57) ABSTRACT

A system comprising a cryogenic engine system and a refrigeration system, wherein the cryogenic engine system and the refrigeration system are mechanically and/or thermally coupled with each other. The refrigeration system is driven by the cryogenic engine system and the cryogenic engine system enhances cooling of the refrigeration system.

18 Claims, 8 Drawing Sheets

(51) Int. Cl.
*F25D 3/10* (2006.01)
*F25B 9/00* (2006.01)
*B60H 1/32* (2006.01)
*F25B 9/06* (2006.01)
*F25B 27/00* (2006.01)
*F25D 19/00* (2006.01)
*F01K 25/10* (2006.01)

(52) U.S. Cl.
CPC ............. *F25B 19/00* (2013.01); *F25B 27/00* (2013.01); *F25D 19/006* (2013.01); *F25B 2327/00* (2013.01)

(58) Field of Classification Search
CPC .... F25D 3/105; F25D 3/207; F24F 2203/023; F24F 2203/025; F01K 25/00; B60H 1/3202
See application file for complete search history.

(56) References Cited

U.S. PATENT DOCUMENTS

| | | | |
|---|---|---|---|
| 3,842,333 A | 10/1974 | Boese et al. | |
| 4,311,917 A | 1/1982 | Hencey, Jr. et al. | |
| 5,823,008 A * | 10/1998 | Nikai | F24F 5/0085 62/401 |
| 6,349,547 B1 * | 2/2002 | Miller | F25B 27/00 62/402 |
| 6,349,787 B1 | 2/2002 | Dakhil | |
| 6,751,966 B2 * | 6/2004 | Viegas | B60H 1/3205 62/131 |
| 2006/0000228 A1 | 1/2006 | Fisher | |
| 2006/0042296 A1 | 3/2006 | Ludwig et al. | |
| 2007/0163261 A1 | 7/2007 | Strathman | |
| 2008/0314059 A1 | 12/2008 | Harkness et al. | |
| 2010/0251751 A1 * | 10/2010 | Lurken | F25D 3/105 62/440 |
| 2010/0319375 A1 | 12/2010 | Matsubara et al. | |

FOREIGN PATENT DOCUMENTS

| | | |
|---|---|---|
| EP | 0599612 A2 | 6/1994 |
| EP | 0599626 A1 | 6/1994 |
| GB | 1038575 | 8/1966 |
| WO | 2001053764 A1 | 7/2001 |
| WO | 2007003912 A3 | 1/2007 |
| WO | 2007025027 A2 | 3/2007 |
| WO | 2007116382 A2 | 10/2007 |
| WO | 2010128233 A1 | 11/2010 |
| WO | 2011126581 A2 | 10/2011 |

OTHER PUBLICATIONS

International Search Report, dated Feb. 3, 2014, in International Application No. PCT/GB2013/053056.
First Office Action issued by the State Intellectual Property Office of the People's Republic of China in connection with corresponding Chinese Application No. 201380060297.4, dated May 17, 2016.
Search Report issued by the State Intellectual Property Office of the People's Republic of China in connection with corresponding Chinese Application No. 201380060297.4, dated May 9, 2016.
Office Action issued by the Japanese Patent Office in connection with corresponding Japanese Application No. 2015-542361, dated Nov. 28, 2017.

* cited by examiner

REFRIGERATION

FIELD OF THE INVENTION

The invention relates to a system comprising a cryogenic engine and a refrigeration system.

BACKGROUND OF THE INVENTION

The majority of vehicle transport refrigeration systems in use today are powered by an internal combustion engine running on diesel fuel, either directly with an auxiliary generator mounted on the refrigerated trailer, or indirectly by taking power from the tractor engine unit mechanically or electrically via an alternator. Cooling is then attained through using that power to drive a standard closed loop refrigeration system.

Typically, both the power take-off and refrigeration unit are over specified for the level of cooling typically required to maintain the compartment temperature in transit. This is for a number of reasons:

i) The refrigeration unit must be capable of cooling down the container after the doors have been opened;
ii) The insulation performance of such cold compartments degrades by 3-5% per year, increasing the cooling power required through the lifecycle; and
iii) APT mandate that the refrigeration unit must be able to extract heat at 1.35 to 1.75 times the heat transfer through the container wall at a 30° C. ambient temperature.

The result of this is that the refrigeration units on mobile vehicles spend much of their operational lives running at an inefficient point. The consequence of this is that coefficients of performance of mobile refrigeration units are typically quite low compared to other cooling equipment (e.g. approximately 0.5 for frozen compartments at −20° C. to 1.5-1.75 for compartments refrigerated to 3° C.).

Currently, it is estimated that approximately 0.05% of total greenhouse gas emissions in the UK come from the refrigeration equipment used for food transportation. This is a small proportion but represents a significant quantity. Consequently, there is a need to reduce emissions from refrigerated transport units. The inefficient use of hydrocarbon fuels for these refrigeration units is also disadvantageous and so a method of reducing their consumption in this application is required.

A number of alternative cooling methods have been proposed. These include energy storage via fuel cells or battery electric for which the cost, infrastructure and charge time drawbacks are known to be undesirable. Eutectic beams employing phase change materials have been used to store cold, but these impose a significant weight penalty. Adsorption and absorption methods utilizing tractor power unit waste heat are known but tend to be bulky and rely on high quality heat from the tractor power unit which may not be available at idle. Air cycle refrigeration systems using air from the cold compartment as the working fluid remove the need for refrigerants, but still require a power source.

Various cryogenic systems have been described whereby a cryogenic fluid such as liquid nitrogen is stored in an insulated vessel and used as a source of cold. These can be grouped generally as systems which use the cryogen directly by spraying it into the cold compartment, as described in WO 2011/126581 and U.S. Pat. No. 3,699,694, systems that use the cryogen indirectly via a heat exchanger, as described in WO 2010/128233 and WO 01/53764, or a mixture of both. It is also known to use a cryogen with an independently powered refrigeration system to reduce the quantity of cryogen that must be carried. In EP 0599612, the cryogen exchanges heat directly with the refrigerant in a slurry tank. The potential for using a heated or vent vapour from indirect heat exchange to drive an air displacement fan has been considered in WO 2007/116382 and EP 0599626.

However, direct use of the cryogen can pose an asphyxiation hazard with many choices of cryogenic fluid. Moreover, existing cooling systems using cryogenic substances are inefficient. Therefore, there exists a need for a commercially-viable, efficient, safe and sustainable cooling system employing the beneficial properties of cryogenic substances.

It is an aim of the invention to address the above problems.

SUMMARY OF THE INVENTION

In accordance with a first aspect of the present invention, there is provided a system comprising: a cryogenic engine system utilizing a working fluid; a refrigeration system including a heat exchange system, wherein: the cryogenic engine system and the refrigeration system are thermally coupled with each other via the heat exchange system such that working fluid in the cryogenic engine system acts as a heat sink for removing heat from the refrigeration system and heat generated by the refrigeration system is used to expand working fluid in the cryogenic engine system.

An advantage of coupling a cryogenic engine system with a refrigeration system is that the refrigeration system can be downsized and used only for maintaining the unit temperature, whilst the cryogenic fluid can also be used directly to achieve benefits such as fast temperature pull down and quiet operation. Further, the heat from the refrigeration compartment may be used to warm the cryogenic fluid before the expansion step and, thus, greatly enhance the efficiency of the cryogenic engine.

The system may also include a refrigeration compartment and wherein said cryogenic engine system may also be a direct heat sink for removing heat from the refrigeration compartment.

Conveniently, the heat exchange system may include a first heat transfer member in direct thermal contact with an interior of the compartment and being in fluid communication to pass working fluid to said cryogenic engine.

In an alternative arrangement, the system may include a refrigeration compartment wherein the cryogenic engine system is an indirect heat sink for removing heat from the refrigeration compartment.

In such an alternative arrangement the heat exchange system may include a second heat transfer member in direct thermal contact with expanded working fluid of the cryogenic engine system, a third heat transfer member in direct thermal contact with the interior of the compartment and further including an intermediate heat transfer fluid circulation system in thermal contact with both the second heat transfer member and the third heat transfer member.

In one particular arrangement the refrigeration system may comprise a vapour compression cycle.

In one arrangement said intermediate heat transfer fluid circulation system may include a compressor for compressing a heat transfer fluid within the system. Such a compressor may be driven by the driving means of the cryogenic engine.

Said first and/or third heat transfer members are configured to exchange heat with an interior of the chamber.

The system may include a first conduit for removing atmosphere from the interior of the chamber and for directing atmosphere over heat transfer members and a second conduit for directing atmosphere back to said interior of said chamber.

The system may include a first conduit for removing atmosphere from the interior of the chamber and for directing atmosphere over heat transfer members and a second conduit for directing atmosphere back to said interior of said chamber.

The system may also include a fan for circulating air from the refrigeration compartment through the first and/or second conduit. Such a fan may be driven by the driving means of the cryogenic engine.

In one arrangement the intermediate heat transfer fluid circulation system may further include: a condenser formed by said second heat transfer member; an expander; and an evaporator formed by said third heat transfer member.

The compressor may be driven by the driving means of the cryogenic engine system.

In one arrangement the system may further comprise a second transfer means extending between a vent or exhaust of the cryogenic engine system and a refrigeration compartment of the refrigeration system for transferring working fluid from the vent or exhaust to the refrigeration compartment.

In an alternative arrangement, the refrigeration system may be an air cycle.

An air cycle refrigeration system may comprise: a first conduit for removing air from a refrigeration compartment; a compressor; a refrigerator heat exchanger for heating air in the refrigeration system prior to expansion; an expander and a second conduit for returning expanded cooled air to a refrigeration compartment.

The compressor of the air refrigeration cycle may be driven by the driving means of the cryogenic engine system.

At least one heat exchanger of the cryogenic engine system may be coupled with at least one heat exchanger of the refrigeration system.

Preferably, at least one of the second heat exchanger and an exhaust heat exchanger of the cryogenic engine system is coupled with a refrigerator heat exchanger.

The system may also include a cryogenic engine system comprising: a tank for storing a working fluid; a first expander mechanically coupled to the driving means in fluid communication with the tank and configured to expand the working fluid so as to output mechanical work via the driving means; and a first heat exchanger in fluid communication between the tank and the first expander and configured to transfer heat to the working fluid before the working fluids delivered to the first expander.

The cryogenic engine system may further comprise a first pump configured to introduce working fluid into the first heat exchanger. Such a first pump may be driven by the driving means.

The cryogenic engine system may further comprise a second heat exchanger in fluid communication with the first expander.

The cryogenic engine system may further comprises a driving means and a second expander mechanically coupled to the driving means and being in fluid communication with the second heat exchanger and configured to expand the working fluid so as to output mechanical work via the driving means and wherein the second heat exchanger is configured to transfer heat to the working fluid WF before the working fluid WF is delivered to the second expander.

The cryogenic engine system may further comprise an exhaust heat exchanger and a vent for expelling working fluid from the cryogenic engine system after the working fluid has passed through one or more of the expanders.

The engine may further include an introducer for introducing heat exchange fluid into the first expander and the first expander may be configured to mix the working fluid with a heat exchange fluid.

The cryogenic engine system may further comprise: a phase separator in fluid communication with the first expander for separating working fluid from heat exchange fluid after expansion; a re-heater for re-heating the heat exchange fluid; and a second pump for returning heat exchange fluid to the first expander The second pump may be driven by the driving means.

The cryogenic engine system may further comprise a vent for expelling working fluid from the cryogenic engine system after the working fluid has passed through the expander(s).

At least one of the one or more expander(s) may be a reciprocating expander.

Alternatively, least one of the expander(s) may be a turbine expander.

Advantageously, the cryogenic engine system is configured to drive at least one further system outside the refrigeration system.

The working fluid of the cryogenic engine system may comprise at least one of liquid nitrogen, liquid air, liquified natural gas, carbon dioxide, oxygen, argon, compressed air or compressed natural gas.

BRIEF DESCRIPTION OF THE DRAWINGS

The invention will now be described, by way of example only, with reference to the accompanying drawings, in which.

In the drawings, like features are denoted by like reference numerals.

DETAILED DESCRIPTION OF THE DRAWINGS

Figure 1:
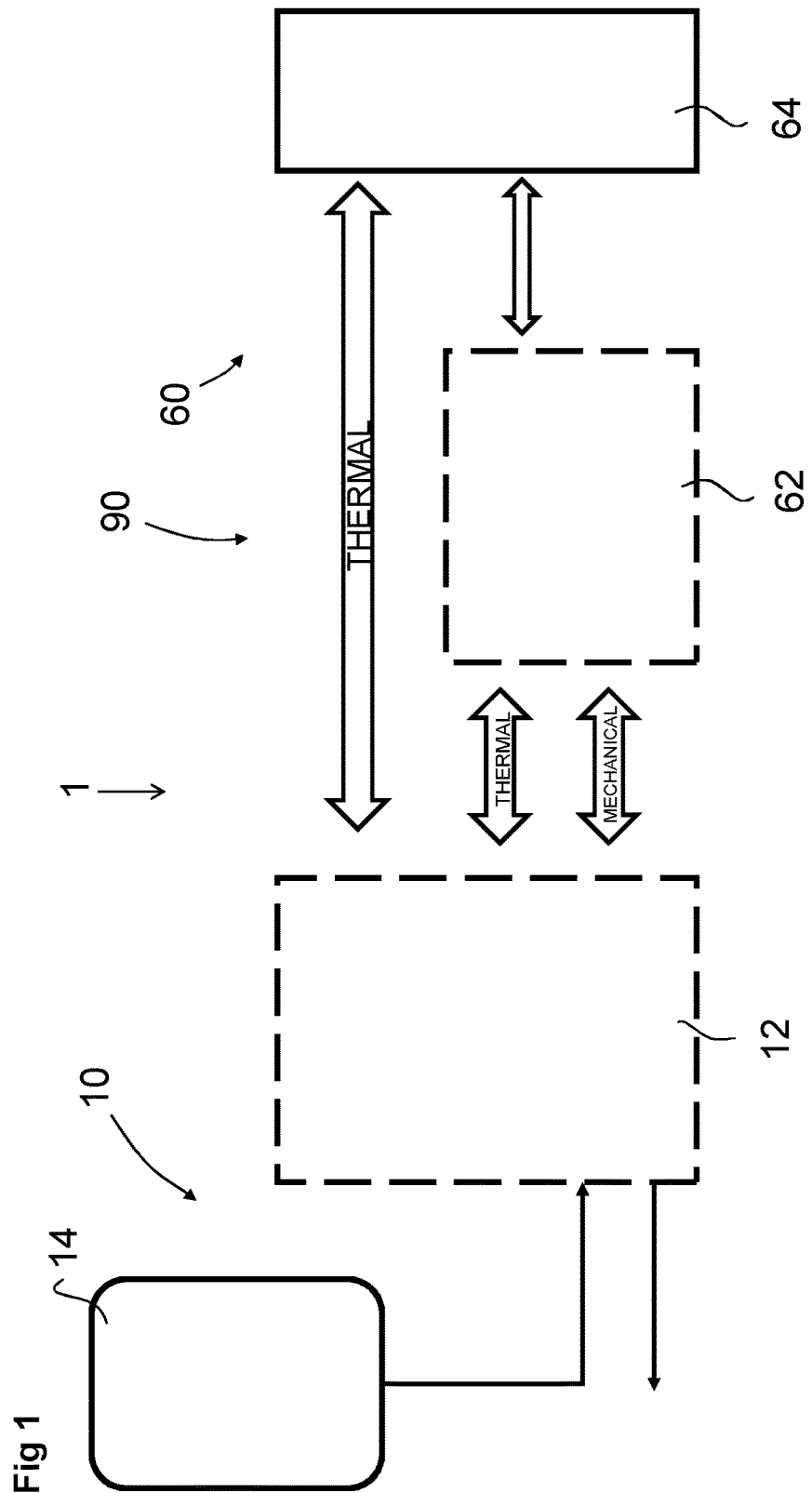
FIG. 1 is a box diagram of a system according to the invention.

FIG. 1 shows a box diagram of a system 1 according to an embodiment of the invention. The system 1 comprises a cryogenic engine system 10 and a refrigeration system 60. The cryogenic engine system 10 comprises a thermodynamic power cycle 12 and a tank 14 for storing a cryogenic working fluid, such as liquid nitrogen, liquid air, liquified natural gas, carbon dioxide, oxygen, argon, compressed air or compressed natural gas, or a mixture of cryogenic fluids, such as liquid air. The skilled person will understand that any other suitable cryogenic working fluid could equally be used. The refrigeration system 60 comprises a refrigeration system 62 which is used to refrigerate a refrigeration compartment 64. A heat exchange system 90 is formed by any one or more components which transfer cold from cryogenic fluid to the interior 64*i* of a refrigeration compartment and/or heat from the interior 64*i* of the refrigeration compartment 64 to the cryogenic fluid WF in order to assist with the expansion thereof.

Figure 7:
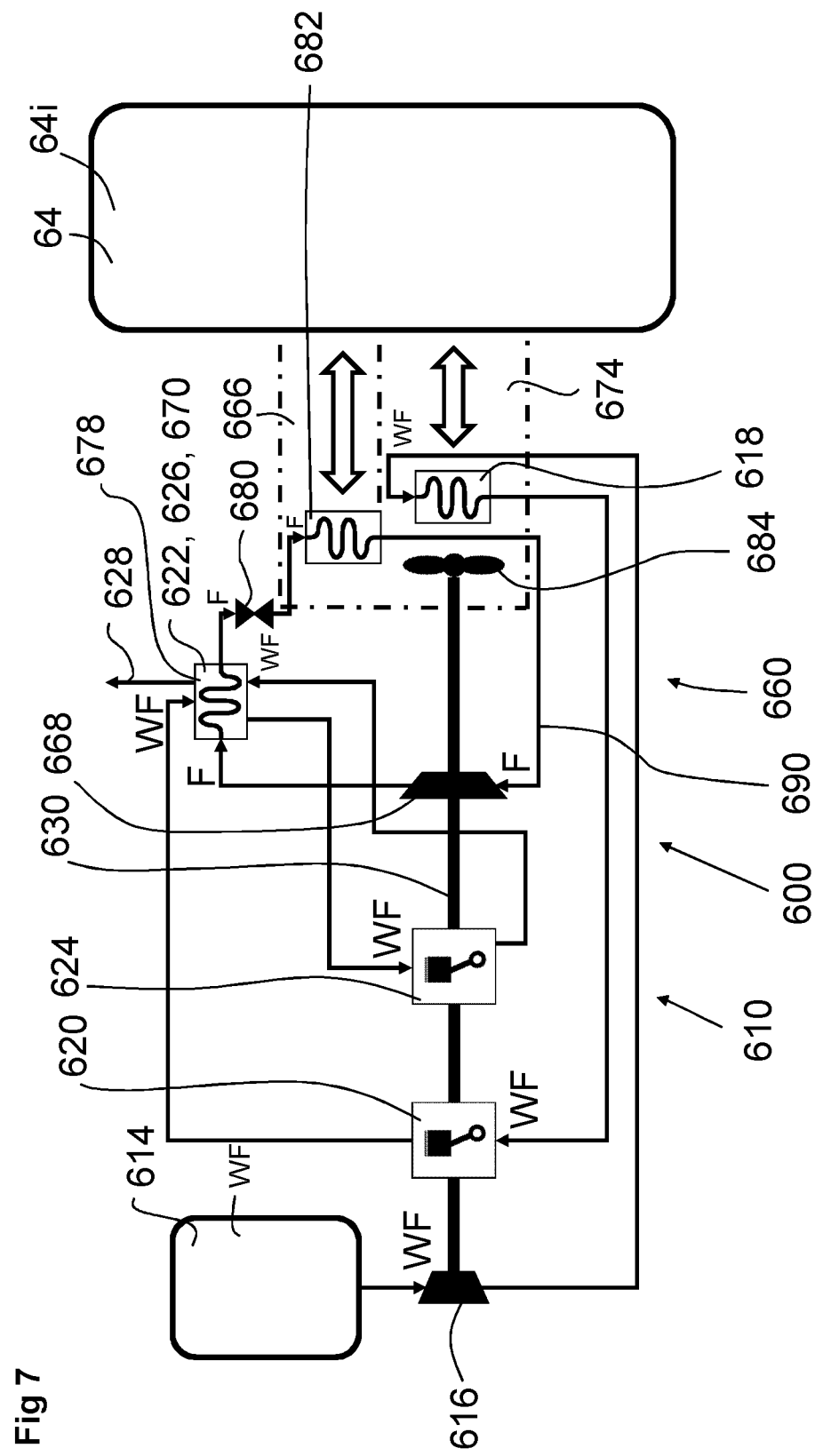
FIG. 7 is a schematic view of a system comprising the cryogenic engine system shown in FIG. 2 and a second exemplary refrigeration system.
Figure 8:
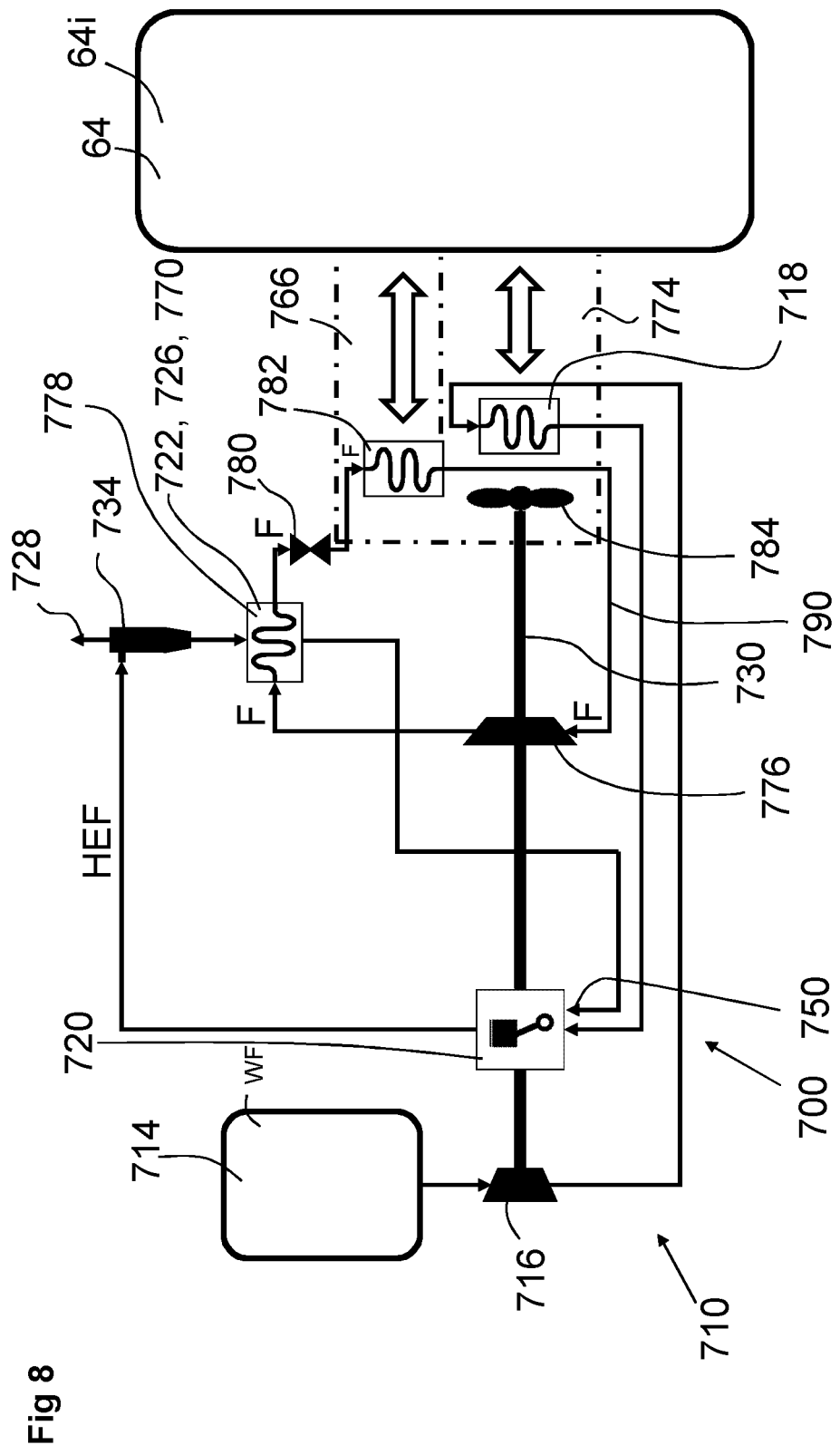
FIG. 8 is an arrangement showing both a reciprocation expander and a turbine expander in combination with each other.

As shown in FIG. 1, the cryogenic engine system 10 and the refrigeration system 60 are mechanically and/or thermally coupled with each other. The cryogenic engine system 10 is mechanically coupled to the refrigeration system 62 of the refrigeration system 60, and is thermally coupled with the refrigeration system 62 and/or directly with the refrigeration compartment 64. The thermal coupling is by means of a heat exchange system 90 discussed in more detail later herein. The mechanical coupling means that the cryogenic engine system 10 mechanically drives the refrigeration system 62. Alternatively, the mechanical coupling can allow the cryogenic engine system to drive an electricity generator for driving the refrigeration system. The thermal coupling means that heat generated by the refrigeration system 60 is used to expand working fluid in the cryogenic engine system 10, and cooling (a result of cryogenic working fluid) in the cryogenic engine system 10 acts as a heat sink for removing heat from the refrigeration system 60. The cryogenic engine system 10 may be a direct or an indirect heat sink for the refrigeration compartment 64. In the direct arrangement, cold from the cryogenic engine is passed directly to a heat exchanger in direct contact with the atmosphere from within the container 64 whilst in the indirect arrangement the cold from the cryogenic engine is first passed to an intermediate heat transfer fluid F which then passes the cold to the atmosphere from within the compartment 64. Both of these arrangements are described in detail later herein. FIGS. 7 and 8 illustrate indirect arrangements.

Figure 2:
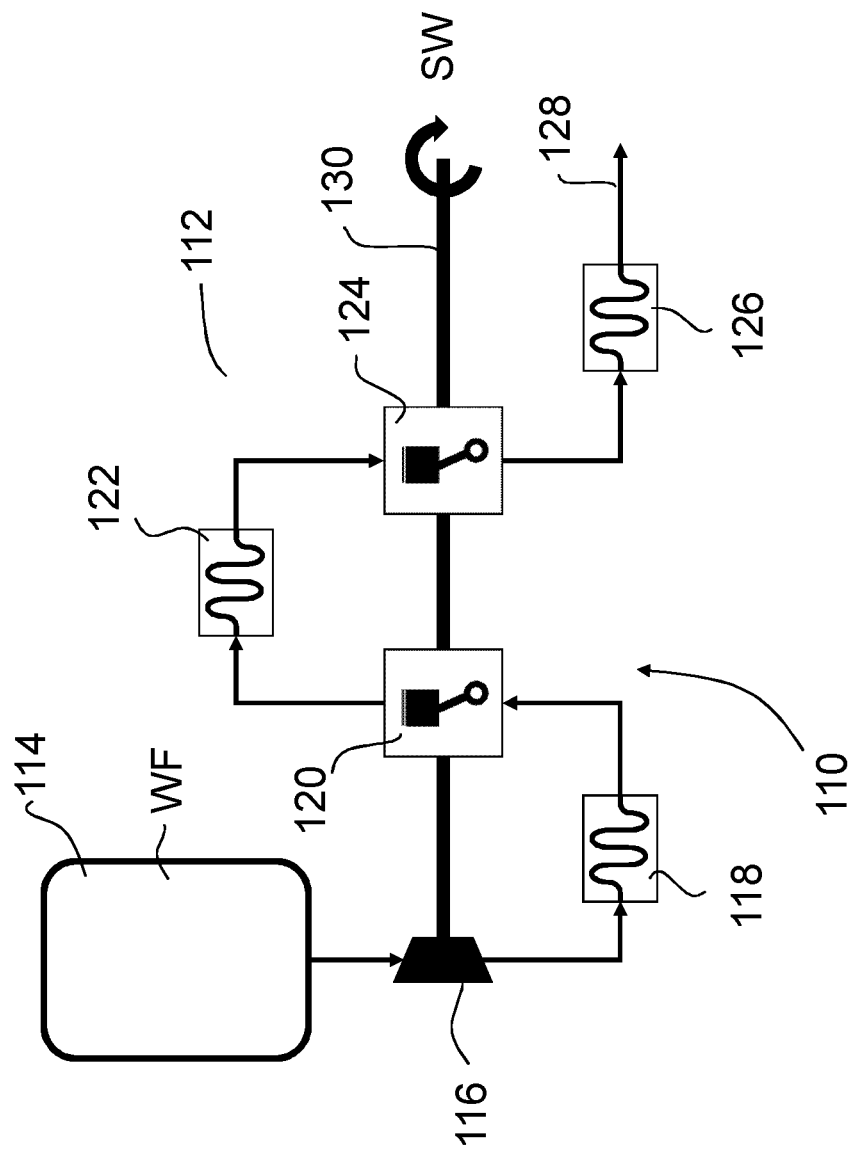
FIG. 2 is a schematic view of a cryogenic engine system according to a first embodiment of the invention.

FIG. 2 shows a cryogenic engine system 110 according to a first embodiment of the invention. A thermodynamic power cycle 112 of the cryogenic engine system 110 involves the delivery of pressurised cryogenic working fluid WF (e.g. liquid nitrogen) from an insulated storage tank 114. This is achieved using a cryogenic pump 116 mounted within the tank 114 or externally, or by tank pressurisation via a heating circuit for example. Liquid nitrogen is delivered to a first heat exchanger 118 for indirect heat transfer in which the liquid nitrogen is vaporised to nitrogen gas and heated prior to being expanded in a first expander 120. As the expansion is near adiabatic there is a drop in nitrogen gas temperature. Cold is therefore captured before and after each expansion stage. The first expansion is followed by any number of subsequent stages involving a further heat exchanger and expansion. The embodiment shown in FIG. 2 comprises a second heat exchanger 122 and a second expander 124. The working fluid or nitrogen gas is also passed through a further indirect exhaust heat exchanger 126 after the final expansion, prior to venting to the atmosphere via a vent 128. The expanders in each stage are of the reciprocating or turbine types generating power through a driving means shown in the figures in the form of a drive shaft 130. Mechanical power output via the drive shaft 130 is used to power other devices or systems, such as a refrigeration system, as described in detail hereafter.

Although the driving means 130 is described herein as a drive shaft, the skilled person will understand that alternative mechanical driving means could be used. Moreover, hydraulic or electrical pumps or motors and other non-mechanical driving means could also be used. Intermediate storage means, such as a battery, can also be provided. Additionally, each expander could be coupled with a separate driving means or drive shaft, in which case the drive shafts are coupled with each other, for example by an electrical coupling.

Figure 3:
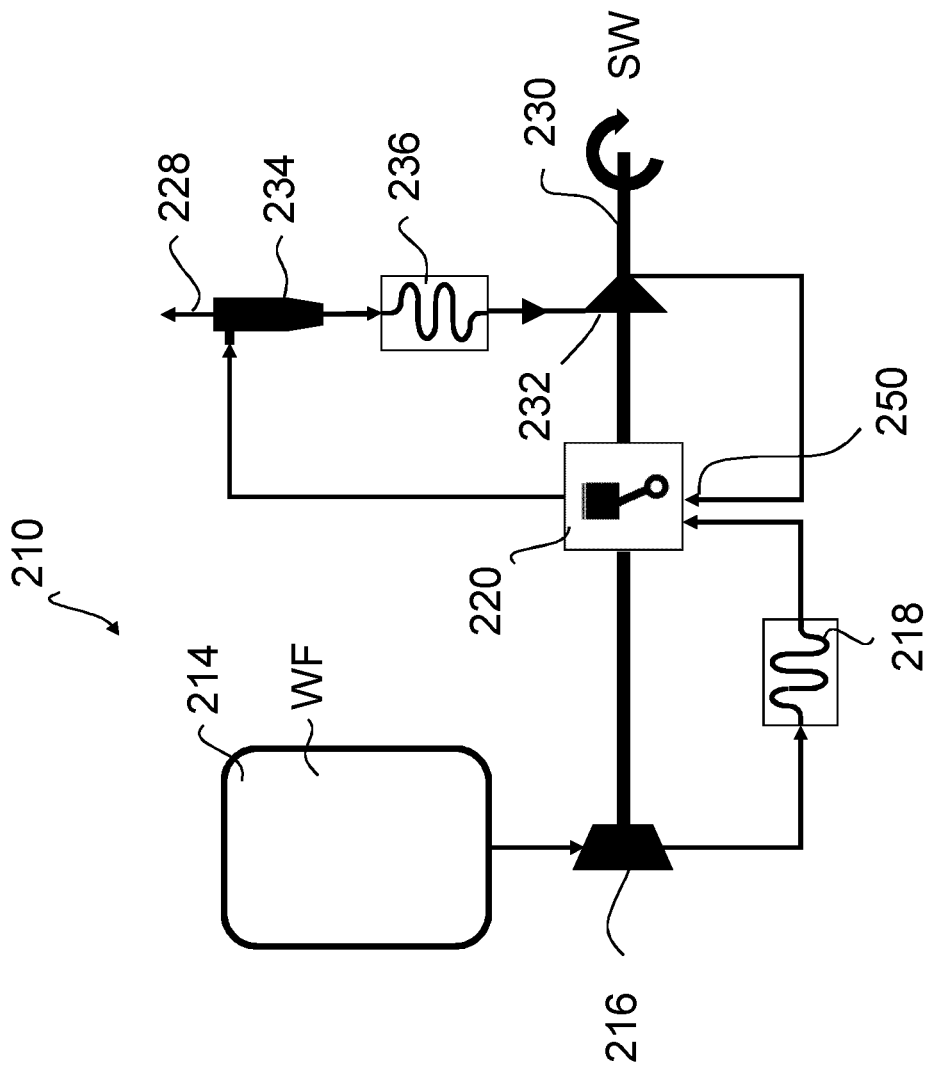
FIG. 3 is a schematic view of a cryogenic engine system according to a second embodiment of the invention.

FIG. 3 shows a cryogenic engine system 210 according to a second embodiment of the invention. The cryogenic engine system 210 comprises a tank 214, a first pump 216, a first heat exchanger 218, a first expander 220 and a vent 228, as described above with reference to FIG. 2. However, in this embodiment, direct contact heat transfer is used to transfer heat to the nitrogen using a heat transfer fluid (such as glycol, water, refrigerant or air) which is introduced into the first expander 220 using a second pump 232 and introducer 250. The nitrogen is therefore heated within the first expander 220 by the heat transfer fluid and may be vaporised. After expansion, the heat transfer fluid is separated from the nitrogen by a cyclonic or other phase separator 234, with the nitrogen gas vented to the atmosphere through the vent 228. Once separated from the nitrogen, the heat transfer fluid is passed through a re-heater 236 and pumped back to the first expander 220 by the second pump 232 for reuse.

In the embodiment shown in FIG. 3, the second pump 232 is driven by a drive shaft 230 which outputs mechanical power from the first expander 220. However, any other conveniently-located power source could equally be used. The expander 220 may again be of the reciprocating or turbine type and consist of multiple or single stages generating power output through the drive shaft 230. Alternatively, each expander may output mechanical work via its own separate drive shaft, in which case the drive shafts are coupled with each other, for example by an electrical coupling.

As shown in FIG. 2 and FIG. 3, the work output by the drive shaft from expansion stages is used to drive the first pump. In the embodiments of the system of the present invention shown in FIGS. 5 to 8, the mechanical power generated by the expansions and output by the drive shaft is used to drive a refrigeration system to cool a refrigeration compartment. The refrigeration system is of any known arrangement that can make use of shaft power, such as vapour-compression or air cycle type.

Figure 4:
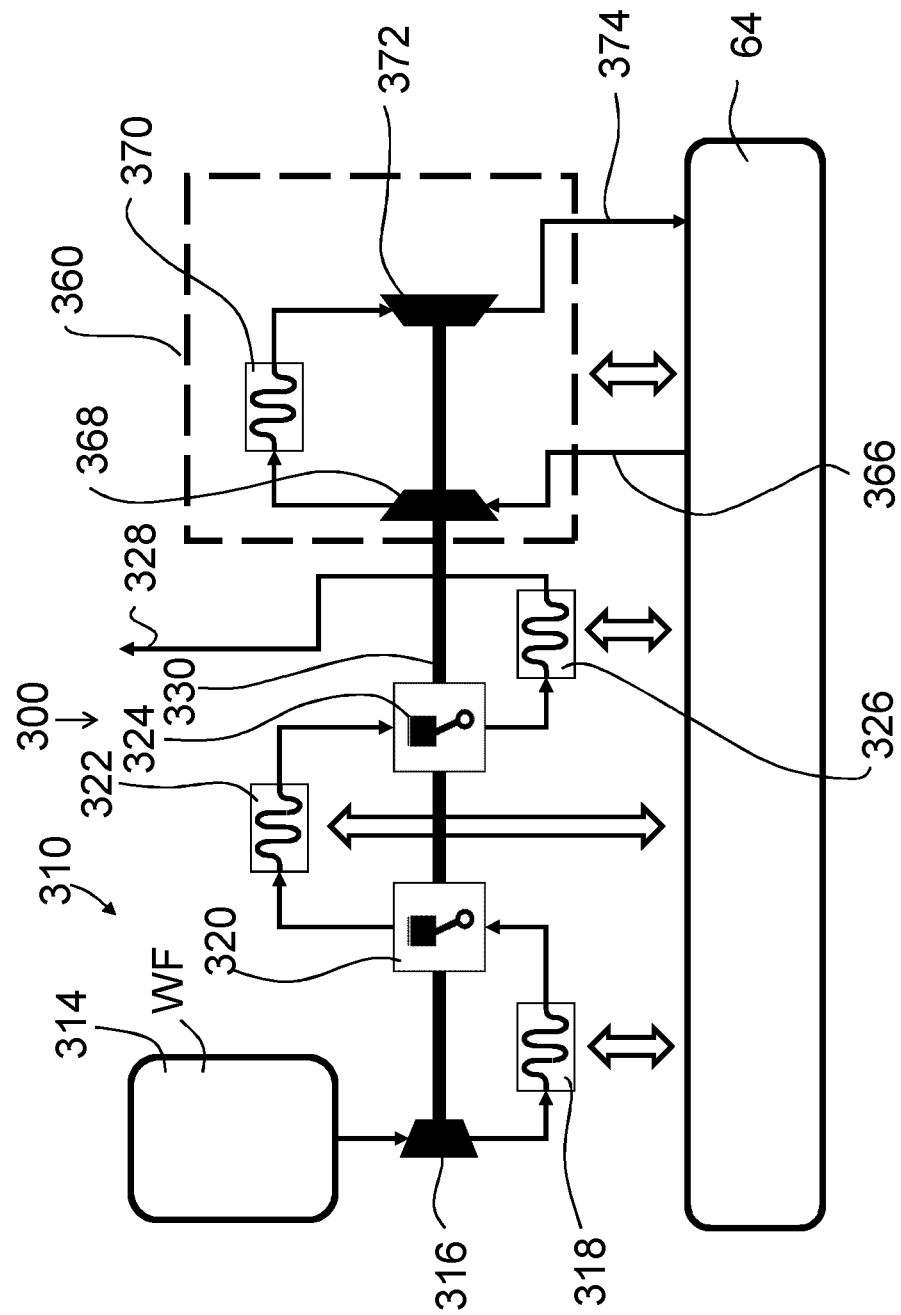
FIG. 4 is a schematic view of the cryogenic engine system shown in FIG. 2 and a first exemplary refrigeration system.

FIG. 4 shows a system 300 comprising a cryogenic engine system 310 like that shown in FIG. 2 coupled mechanically via a drive shaft 330 to a refrigeration system 360. The refrigeration system 360 comprises an air cycle comprising a first conduit 366 for removing air from a refrigeration compartment, a compressor 368, a refrigerator heat exchanger 370, an expander 372, and a second conduit 374 for returning cold air to a refrigeration compartment. FIG. 4 shows that the drive shaft 330 drives the compressor 368 of the refrigeration system 360.

The expander 372 of the refrigeration system assists with driving of the drive shaft 330.

It is also advantageous to achieve thermal coupling, as well as mechanical coupling, between the cryogenic engine system and the refrigeration system. FIGS. 5 to 8 show embodiments of the invention which achieve this advantage. In these embodiments, heat exchangers in the cryogenic engine system are coupled with those in the heat exchange system 90 through appropriate pipework or other means of interface. The purpose of this is to scavenge heat from the compartment 64 to warm the cryogenic fluid in the cryogenic engine system ready for expansion. Heat may also come from the atmosphere (ambient heat) or any other source like from an IC engine. The other benefit of this approach is to enhance heat rejection from the refrigeration system, thereby improving the refrigeration properties of the system. It can be beneficial for this heat transfer to be additional to heat transfer with the environment in a combined heat exchanger/radiator.

Figure 5:
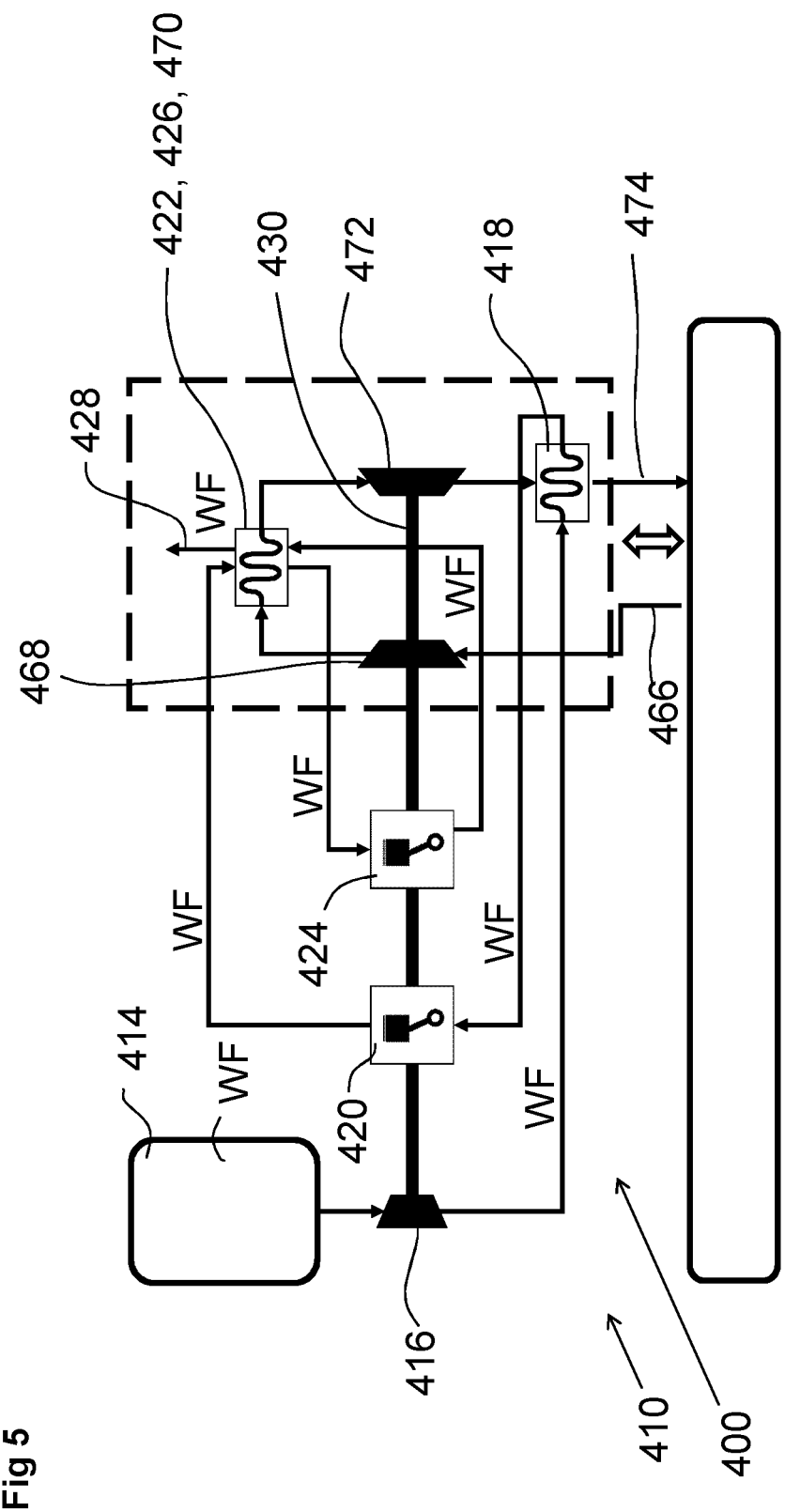
FIG. 5 is a schematic view of a system comprising the cryogenic engine system shown in FIG. 2 and the first exemplary refrigeration system.

FIG. 5 shows a system 400 comprising a cryogenic engine system 410 (like that described above with reference to FIG. 2) having a two-stage thermodynamic power cycle coupled to an air cycle refrigeration system, as described with reference to FIG. 4. Second 422 and exhaust 426 heat exchangers of the cryogenic engine system are thermally coupled with a heat exchanger 470 on the hot side of the refrigeration system. This may be additional, or used to replace heat exchange with the atmosphere in the refrigeration system. A first stage heat exchanger 418 (or vaporiser) is coupled with a return air flow 474 (i.e. cold air being returned to the refrigeration compartment) to allow further cooling of the return air by the cryogen before return to the cold compartment. If the cryogenic fluid is liquid air it may also be preferable to vent cold exhaust directly to the compartment. As described previously, a first pump 416 of the cryogenic engine system 410, and a compressor 468 of the refrigeration system 460 are all driven by a drive shaft 430 which outputs mechanical work provided by the expanders of the cryogenic engine system 410. The expander 472 of the refrigeration system assists with driving the drive shaft 430.

Figure 6:
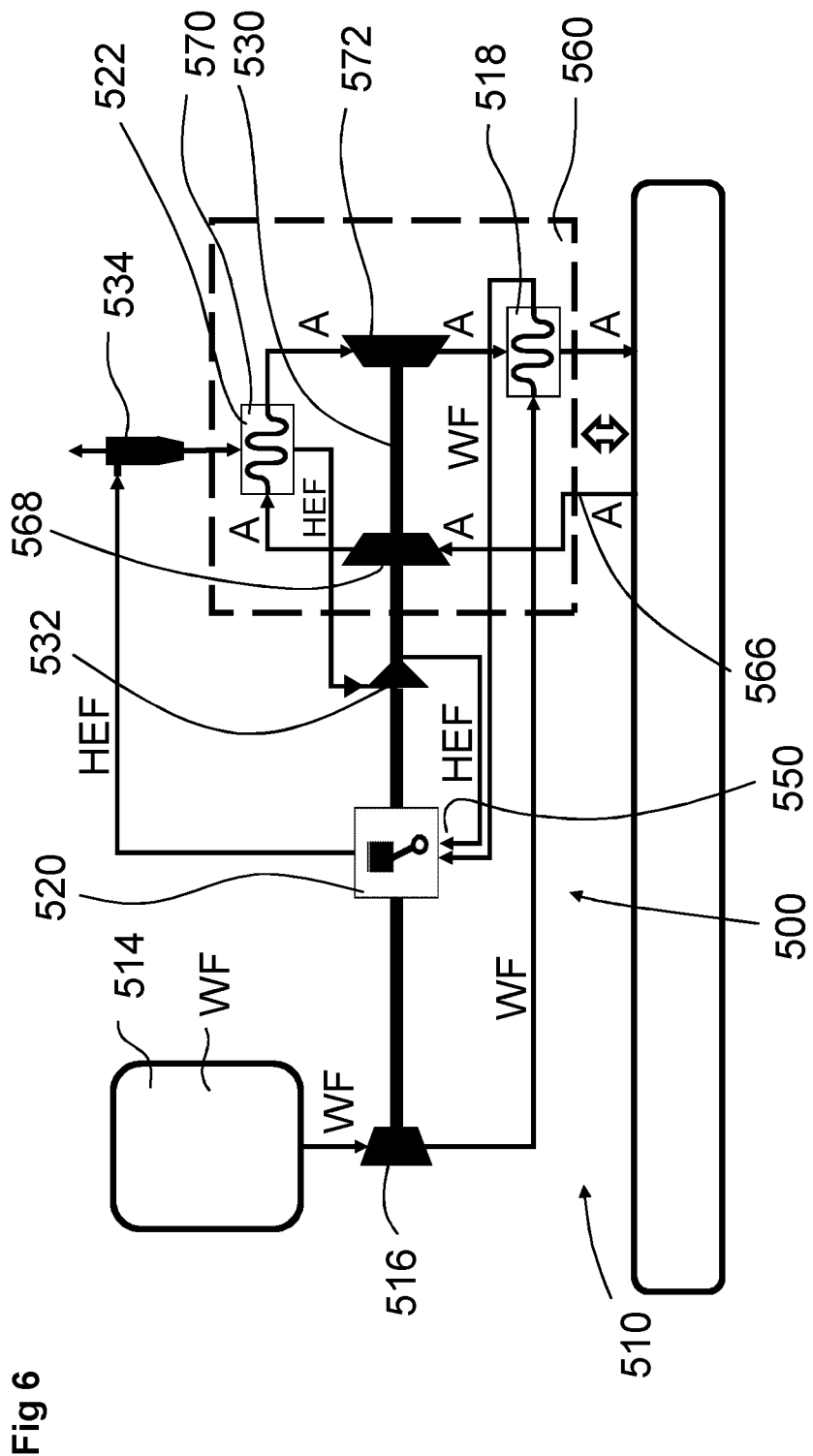
FIG. 6 is a schematic view of a system comprising the cryogenic engine system shown in FIG. 3 and the first exemplary refrigeration system.

FIG. 6 shows a similar system 500 to FIG. 5, but with the cryogenic engine system replaced with a system 510 like that shown in FIG. 3. In this arrangement, a heat exchange fluid (HEF) is used to heat nitrogen in the cryogenic engine system 510 during expansion in a first expander 520, and beneficially a heat exchange fluid (HEF) re-heat uses heat from the hot side of the air cycle of the refrigeration system. Introducer 550 allows for the HEF to be introduced into the expander 550. This allows for higher than ambient temperatures in the nitrogen expansion, increasing the work output of the power cycle of the cryogenic engine system 510.

FIG. 7 shows a further embodiment in which a cryogenic engine system 610 like that described above with reference to FIG. 2 is coupled with a vapour compression refrigeration system 660 comprising a first conduit 666 for removing air/atmosphere from a refrigeration compartment 64, a compressor 676, a condenser 678, an expansion valve 680, an evaporator 682, a second conduit 674 for returning cold air to a refrigeration compartment 64, and a fan 684 for circulating air from the refrigeration compartment 64 through the first and/or second conduit for cooling. Second 622 and exhaust 626 heat exchangers are thermally coupled with the condenser 678 of the refrigeration system 660. A first stage heat exchanger 618 and the evaporator 682 are arranged so as to sequentially exchange heat with cold air from a refrigeration compartment 64. An intermediate heat transfer fluid circulation system 690 is used between the components of the refrigeration system 660 and contains a heat transfer fluid F. As described previously, a first pump 616 of the cryogenic engine cycle, and the compressor 676 of the refrigeration system are driven by a drive shaft 630 which outputs mechanical work provided by the expanders of the cryogenic engine system 610. The fan 684 driving air flow over the cooling coils is also powered by the drive shaft 630.

FIG. 8 illustrates a still further arrangement in which heat exchange fluid (HEF) is used in the cryogenic engine arrangement, as discussed before whilst a heat transfer fluid F is used in the refrigeration circuit. In more detail, working fluid WF is passed through first heat exchanger 718 such as to expand the working fluid prior to it being introduced into the expander 720. Heat exchange fluid HEF is provided in a separate circuit including an introducer 750 for introducing the HEF into the expander 750, a phase separator 734 for separating HEF from WF and allowing spent working fluid to be vented to atmosphere via exhause 728 and HEF to be re-circulated via a heat exchanger condenser 722, 726, 770, 778 in which it is re-heated before being sent back to the expander 720 for re-use. The heat exchanger 722 also acts as the condenser heat exchanger 778 in the refrigeration system circuit 790. The circuit 790 further includes a compressor 776 which is preferably driven by the driving means 730 of the cryogenic engine 710, an expander 780 for expanding circulating fluid F and an evaporator 782 much as described with reference to FIG. 7 above. Fluid F which has been expanded passes through the heat exchanging evaporator 782 before being returned to the compressor 776. The arrangement further includes a first conduit 666 for removing air/atmosphere from a refrigeration compartment 64 and causing said atmosphere to pass over expander heat exchanger 782 such as to exchange heat between the atmosphere from the compartment 64 and the fluid F, thereby to chill the atmosphere and a second conduit 774 before returning atmosphere to the container 64. The first heat exchanger 718 may be placed in the flow path of the atmosphere and, conveniently, may be placed within the second conduit 774 such as to chill or further chill the atmosphere by means of heat transfer. Heat exchangers 782 and 718 may be arranged in series or in parallel within one or other or both of conduits 766, 774.

It will be appreciated that the heat exchangers 118, 122, 126, 218, 236, 318, 322, 326, 370, 418, 422, 426, 470, 518, 570, 618, 622, 626, 670, 718, 782, 770 of the above arrangements individually and/or in combination with each other effectively form a heat exchange system 90 to exchange heat between the cryogenic engine and one or other or both of the refrigeration system 60 or the refrigeration compartment 64 itself. One or more of these heat exchangers may be referred to as a heat transfer member when performing the heat transfer task. Direct heat exchange within this specification refers to exchange of heat between the cryogenic engine and the atmosphere from within a refrigeration compartment 64 via a single heat exchanger whilst indirect heat exchange refers to arrangements which employ an intermediate heat transfer fluid.

In all of the above-described embodiments, the shaft power from the cryogenic engine output by the drive shaft or drive shafts (assisted by any expanders within the refrigeration system) is used to drive the compressors, pumps and any fans in the refrigeration system. In an alternative embodiment, all or part of the shaft power output by the drive shaft is used as an auxiliary power source and thus used, for example, to drive an alternator for lighting or control purposes or used as a primary source to supply power to the tractor.

Examples of applications for the system of the present invention include refrigerated trailers for heavy goods vehicle, refrigeration systems for light goods vehicles and vans and systems for refrigerated containers used in shipping. The system is also beneficial for some classes of static refrigerated containers and buildings. In all of the aforementioned applications, the term refrigerated applies to any sub-ambient holding temperature including but not limited to the standard temperature for transport of perishable produce (~0° C.) and for frozen produce (~−20° C.). There are also potential applications for this invention for all classes of air conditioning systems especially those installed in transport applications.

The present invention has been described above in exemplary form with reference to the accompanying drawings which represent embodiments of the invention. It will be understood that many different embodiments of the invention exist, and that these embodiments all fall within the scope of the invention as defined by the following claims.

The invention claimed is:

1. A system comprising:
   a cryogenic engine system comprising:
      an output shaft;
      a first expander utilizing a working fluid and heat exchange fluid within the first expander;
      a circuit comprising an introducer, the introducer providing said heat exchange fluid into the first expander and wherein the first expander is configured to cause expansion of said working fluid within the first expander such as to produce shaft power;
   a refrigeration system, including a heat exchange system wherein:
   the cryogenic engine system and the refrigeration system are thermally coupled with each other via the heat exchange system such that the working fluid or heat exchange fluid in the cryogenic engine system acts as a heat sink for removing heat from the refrigeration system and heat generated by the refrigeration system is used to expand the working fluid in the cryogenic engine system;
   a refrigeration compartment thermally connected to the heat exchange system;
   wherein the cryogenic engine system is a direct and an indirect heat sink for removing heat from the refrigeration compartment; and
   wherein the heat exchange system comprises:
   a first heat transfer member in direct thermal contact with the working fluid from the cryogenic engine system and in direct thermal contact with the refrigeration compartment;
   a second heat transfer member in direct thermal contact with expanded working fluid and the heat exchange fluid of the cryogenic engine system;
   a third heat transfer member in direct thermal contact with an interior of the refrigeration compartment; and
   an intermediate heat transfer fluid circulation system in thermal contact with both the second heat transfer member and the third heat transfer member.

2. The system according to claim 1, wherein the refrigeration system includes a vapor compression cycle.

3. The system as claimed in claim 1 wherein said intermediate heat transfer fluid circulation system includes a heat transfer fluid and a compressor for compressing the heat transfer fluid within the system.

4. The system as claimed in claim 3 wherein said cryogenic engine system includes a driving means and said compressor is driven by said driving means.

5. The system as claimed in claim 1 including a first conduit for removing atmosphere from the interior of the refrigeration compartment and for directing atmosphere over heat transfer members and a second conduit for directing atmosphere back to said interior of said refrigeration compartment.

6. The system as claimed in claim 5 including a fan for circulating atmosphere from the refrigeration compartment through the first and second conduits.

7. The system according to claim 3, wherein the intermediate heat transfer fluid circulation system further includes:
   a condenser formed by said second heat transfer member; and
   an evaporator formed by said third heat transfer member.

8. The system according to claim 1, further comprising a transfer means extending between a vent or an exhaust of the cryogenic engine system and the refrigeration compartment of the refrigeration system for transferring the working fluid from the vent or the exhaust to the refrigeration compartment.

9. The system according to claim 1, wherein the refrigeration system is an air cycle and comprises:
   a first conduit for removing air from the refrigeration compartment;
   a compressor;
   a refrigerator heat exchanger for cooling air in the refrigeration system prior to expansion; and
   a second conduit for returning expanded cooled air to the refrigeration compartment.

10. The system according to claim 9, wherein said cryogenic engine system includes a driving means and the compressor of the refrigeration system is driven by the driving means.

11. The system according to claim 9, wherein at least one heat transfer member of the cryogenic engine system is coupled with at least one refrigerator heat exchanger of the refrigeration system.

12. The system according to claim 9, wherein at least one of a second heat exchanger and an exhaust heat exchanger of the cryogenic engine system is coupled with the refrigerator heat exchanger.

13. The system according to claim 1, wherein the cryogenic engine system further comprises:
   a tank for storing the working fluid; and
   a driving means;
   wherein:
      the first expander is coupled to the driving means and in fluid communication with the tank; and
      the first heat transfer member is in fluid communication between the tank and the first expander and configured to transfer heat to the working fluid before the working fluid is delivered to the first expander.

14. The system as claimed in claim 1, wherein the cryogenic engine system further comprises:
   a first pump configured to introduce the working fluid into the first heat exchanger;
   a phase separator in fluid communication with the first expander for separating the working fluid from the heat exchange fluid after expansion;
   a re-heater for re-heating the heat exchange fluid; and
   a second pump for returning the heat exchange fluid to the first expander.

15. The system as claimed in claim 1, wherein the working fluid comprises at least one of liquid nitrogen, liquid air, liquefied natural gas, carbon dioxide, oxygen, argon, compressed air or compressed natural gas.

16. The system according to claim 1, wherein the cryogenic engine system further comprises:
   a first pump configured to introduce the working fluid into the first heat exchanger;
   a phase separator in fluid communication with the first expander for separating the working fluid from the heat exchange fluid after expansion;
   a re-heater for re-heating the heat exchange fluid; and a second pump for returning the heat exchange fluid to the first expander, wherein the second pump is driven by the driving means.

17. A system comprising:
a cryogenic engine system comprising:
   an output shaft;
   a tank for storing a working fluid;
   a driving means;
   a first expander coupled to the driving means and utilizing the working fluid and heat exchange fluid within the first expander, the first expander coupled to the driving means and in fluid communication with the tank and configured to expand the working fluid so as to output mechanical work via the driving means;
   a first heat transfer member in fluid communication between the tank and the first expander and configured to transfer heat to the working fluid before the working fluid is delivered to the first expander; and
   a circuit comprising an introducer, the introducer providing said heat exchange fluid into the first expander and wherein the first expander is configured to mix the working fluid with the heat exchange fluid to cause expansion of said working fluid within the first expander such as to produce shaft power;
a refrigeration system, including a heat exchange system wherein:
the cryogenic engine system and the refrigeration system are thermally coupled with each other via the heat exchange system such that the working fluid or heat exchange fluid in the cryogenic engine system acts as a heat sink for removing heat from the refrigeration system and heat generated by the refrigeration system is used to expand the working fluid in the cryogenic engine system;
a refrigeration compartment thermally connected to the heat exchange system;
wherein the cryogenic engine system is a direct and an indirect heat sink for removing heat from the refrigeration compartment; and
wherein the heat exchange system comprises:
the first heat transfer member in direct thermal contact with the working fluid from the cryogenic engine system and in direct thermal contact with the refrigeration compartment;
a second heat transfer member in direct thermal contact with expanded working fluid and the heat exchange fluid of the cryogenic engine system;
a third heat transfer member in direct thermal contact with an interior of the refrigeration compartment; and
an intermediate heat transfer fluid circulation system in thermal contact with both the second heat transfer member and the third heat transfer member.

18. The system as claimed in claim 1 wherein said first and third heat transfer members are configured to exchange heat with the interior of the refrigeration compartment.

* * * * *